United States Patent
Dean et al.

(10) Patent No.: US 6,794,055 B2
(45) Date of Patent: Sep. 21, 2004

(54) ALKYD-BASED FREE RADICAL CURED WOOD STAINS

(75) Inventors: Roy E. Dean, Lower Burrell, PA (US); Truman F. Wilt, Clinton, PA (US); Shawn A. DeSaw, McMurray, PA (US); M. Lisa Perrine, Allison Park, PA (US); Michael J. Ziegler, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/357,091

(22) Filed: Feb. 3, 2003

(65) Prior Publication Data

US 2004/0151931 A1 Aug. 5, 2004

(51) Int. Cl.$^7$ .............................................. B32B 21/04
(52) U.S. Cl. ................... 428/537.1; 428/522; 428/525; 427/372.2; 427/384; 427/385.5; 524/460; 525/80; 528/272
(58) Field of Search .................... 428/551.1, 537.1, 428/522, 525; 524/460; 427/372.2, 384, 385.5; 525/80; 528/272

(56) References Cited

U.S. PATENT DOCUMENTS

| | | | |
|---|---|---|---|
| 3,664,861 A | 5/1972 | Okamura et al. | 117/93.31 |
| 4,111,871 A | 9/1978 | Aritomi | 260/22 CB |
| 4,267,239 A | 5/1981 | Thankachan et al. | 428/425.1 |
| 4,273,690 A | 6/1981 | Walus | 260/22 CB |
| 4,591,518 A | 5/1986 | Schillinger et al. | 427/385.5 |
| 4,656,202 A * | 4/1987 | Nason et al. | 522/89 |
| 4,894,317 A | 1/1990 | Mauyama et al. | 430/319 |
| 5,286,778 A * | 2/1994 | Dean et al. | 524/460 |
| 5,744,248 A | 4/1998 | Meixner et al. | 428/482 |
| 5,821,324 A | 10/1998 | Jones | 528/295.5 |
| 5,942,556 A | 8/1999 | Friedlander et al. | 522/76 |
| 6,017,640 A | 1/2000 | Muthiah et al. | 428/514 |
| 6,201,057 B1 * | 3/2001 | Porter | 524/501 |
| 6,358,614 B1 * | 3/2002 | Porter | 428/447 |
| 6,475,615 B2 * | 11/2002 | Porter | 428/334 |

FOREIGN PATENT DOCUMENTS

| | | |
|---|---|---|
| CN | 1136579 | 11/1996 |
| EP | 0 002 866 | 7/1981 |
| JP | 53031911 | 9/1978 |
| JP | 53115311 | 10/1978 |
| JP | 62020566 | 1/1987 |
| JP | 63246890 | 10/1988 |
| JP | 01028381 | 1/1989 |
| JP | 02129213 | 5/1990 |
| JP | 04041563 | 2/1992 |
| JP | 04041564 | 2/1992 |
| JP | 04187427 | 7/1992 |
| JP | 2001002969 | 1/2001 |
| WO | WO 98/14500 | 4/1998 |
| WO | WO 98/56846 | 12/1998 |
| WO | WO 99/47617 | 9/1999 |
| WO | WO 01/27181 | 4/2001 |

OTHER PUBLICATIONS

G. Odian, Principles of Polymerization, Second Edition, 1981, pp. 138.*

* cited by examiner

Primary Examiner—Leszek B. Kiliman
(74) Attorney, Agent, or Firm—Diane R. Meyers

(57) ABSTRACT

Stains comprising a polymer, an initiator, a colorant and a solvent are disclosed. The polymer comprises an alkyd portion and a free radical curable portion that is pendant from the alkyd portion; the alkyd portion includes one or more fatty acid moieties that can be derived from one or more drying, semi-drying or nondrying oils. When drying or semi-drying oils are used, the molecules of the present invention exhibit a dual cure, both oxidative and free radical. The compositions are particularly suitable for staining substrates comprising wood. Methods for using the present compositions are also disclosed.

31 Claims, No Drawings

ALKYD-BASED FREE RADICAL CURED WOOD STAINS

FIELD OF THE INVENTION

The present invention is directed to stains suitable for application to porous substrates. More specifically, the invention relates to alkyd-based stains that can be cured by free radical curing.

BACKGROUND OF THE INVENTION

There are a number of considerations relevant to coatings for wood substrates, such as cabinets, furniture, and the like. For example, the coating compositions should be curable without the need to apply excessive heat; wood substrates cannot be subjected to the high temperatures that can be used to cure coatings, for example, on metal substrates. In addition, it is desirable that the coatings offer sufficient resistance to mar and scratch, while at the same time having an aesthetically pleasing appearance. Finally, as with most coatings, environmental considerations are also relevant. Thus, improved coatings taking into account all of these considerations are desired.

SUMMARY OF THE INVENTION

The present invention is directed to coating compositions, specifically stains, comprising a polymer, an initiator, and one or more pigments and/or dyes as the colorant. The polymer comprises an alkyd portion or moiety and a free radical curable portion or moiety. An alkyd, as is known in the art, is the reaction product of a polybasic acid and a polyhydric alcohol in the presence of an oil or fatty acid. Thus, the alkyd portion of the polymer can comprise a fatty acid moiety. An appropriate free radical initiator is selected based upon the type of free radical moiety used.

It will be understood that the present compositions can be cured by free radical cure. When the fatty acid moiety of the alkyd is derived primarily from a drying or semi-drying oil, the present compositions are also capable of oxidative cure, that is, cure at ambient temperature upon exposure to air. Significantly, the dual curing mechanism of certain embodiments of the present compositions does not interfere with the properties obtained from the cured coatings; indeed, the dual curing mechanism of certain embodiments may improve the properties obtained from the cured coatings.

DETAILED DESCRIPTION OF THE INVENTION

The present invention is directed to a composition, specifically a stain, comprising a polymer, an initiator, a colorant portion and a solvent. The polymer further comprises an alkyd portion and a free radical curable portion. The polymers are more specifically described as ungelled alkyd resins containing pendant polymerizable groups. Typically, these groups will contain ethylenic unsaturation, and are therefore suitable for free radical cure. The free radical cure initiator is selected based on the type of free radical curable moiety or moieties that are incorporated onto the polymer.

The alkyd portion of the present polymers can be prepared by first heating a polybasic acid or anhydride and a polyfunctional alcohol with a polyol alcoholysis reaction product. The polyol alcoholysis reaction product can be an oil, or an oil derivative, modified by ester interchange with a polyfunctional alcohol in order to form esters having an average hydroxyl functionality of two. The polyol alcoholysis reaction product contains hydroxyl groups. It will be understood that a small percent of the various reaction products may include some constituents of the polyol reaction product that do not contain hydroxyl groups, but the majority of the reaction products will contain hydroxyl groups.

Suitable polybasic acids/anhydrides that can be used in forming the alkyds used in the present polymers include polycarboxylic acids and anhydrides thereof. Examples of polycarboxylic acids include phthalic acid, isophthalic acid, terephthalic acid, tetrahydrophthalic acid, hexahydrophthalic acid, adipic acid, azelaic acid, glutaric acid, 3,3-diethylglutaric acid, malonic acid, pimelic acid, sebacic acid, suberic acid, succinic acid, 2,2-dimethylsuccinic acid, 2-methylsuccinic acid, dodecenylsuccinic acid, itaconic acid, fumaric acid, maleic acid, citraconic acid, diethyl maleic acid, and trimellitic acid; the anhydrides of those polybasic acids are also suitable. Phthalic anhydride together with small amounts of hexahydrophthalic anhydride are particularly suitable. Polybasic acids having greater than three acid moieties or the higher polyfunctional alcohols should not be utilized in amounts that will cause the alkyd resin to gel during preparation.

The oil used in the polyol alcoholysis reaction product can be selected from one or more drying oils, one or more semi-drying oils, one or more non-drying oils, and mixtures thereof. When one or more drying oils, one or more semi-drying oils or mixtures of drying and semi-drying oils are used, the present compositions will be capable of undergoing oxidative cure. Similarly, if a mixture of at least one of the drying oils or the semi-drying oils with a non-drying oil is used, with the mixture being predominantly drying and/or semi-drying, the compositions will also undergo oxidative cure. "Predominantly drying" and/or "semi-drying" means that at least about 45 percent of the oils used are drying and/or semi-drying. Both drying and semi-drying oils contain carbon-carbon double bonds that are capable of undergoing oxidative crosslinking, whereas nondrying oils either don't contain such bonds or don't contain a sufficient number of such bonds to effect cure. Examples of drying and semi-drying oils include castor oil, dehydrated castor oil, cottonseed oil, fish oil, linseed oil, menhaden oil, oiticica oil, palm kernel oil, perilla oil, safflower oil, sardine oil, soybean oil and tung oil. Linseed oil is an especially suitable drying oil. Examples of non-drying oils include valeric acid, heptanoic acid, 2-ethyl hexanoic acid, pelargonic acid, isononanoic acid, lauric acid, coconut oil fatty acid, stearic acid and branched fatty acids containing 18 carbon atoms. Predominantly drying/semi-drying oils are often more appropriate for use in the present stains. In one embodiment of the invention, tall oil is specifically excluded.

Suitable polyfunctional alcohols that can be used for both the reaction with the polybasic acid/anhydride and for use in preparation of the polyol alcoholysis product include polyhydric alcohols having 2 to 6 hydroxyl groups per molecule including dihydric alcohols such as ethylene glycol, 1,2-propylene glycol, 2,3-butylene glycol, 1,4-butanediol, 1,5-pentanediol and 2,2-bis(4-hydroxycyclohexyl)propane; trihydric alcohols such as glycerine, 1,1,1-trimethylolethane, 1,1,1-trimethylolpropane and 1,2,6-hexanetriol; tetrahydric alcohols such as erythritol, pentaerythritol and alpha-methyl glucoside; pentahydric and hexahydric alcohols such as tetramethylol-cyclohexanol, dipentaerythritol, mannitol and sorbitol; polyallyl alcohol; and oxyalkylene adducts such as diethylene glycol, triethylene glycol and polyethylene glycol. 1,1,1-trimethylolpropane and pentaerythritol are particularly suitable; the alcohol used in the polybasic acid/ anhydride reaction can be the same or different as the alcohol used in the alcoholysis reaction.

The alkyd portion can also be prepared by first reacting a free fatty acid with a polyfunctional alcohol to form esters having an average hydroxyl functionality of two. These esters are then admixed with the polybasic acid and the polyfunctional alcohol and the mixture heated to form the alkyd portion of the present polymers. It is also possible to prepare the alkyd by incorporating the fatty acid and the polyfunctional alcohol with the polybasic acid and heating the mixture to reaction temperature.

Examples of free fatty acids include those derived from the oils listed above by known processes, such as fatty acids having 4 to 22 carbon atoms and characterized by a terminal carboxyl group, such as octanoic acid, decanoic acid, dodecanoic acid, hexadecanoic acid, octadecanoic acid, cis-9-octadecenoic acid, 12-hydroxy-cis-9-octadecenoic acid, cis-9, cis-12-octadecadienoic acid, cis-9, cis-12, cis-15-octadecatrienoic acid, cis-9, trans-11, trans-13-octadecatrienoic acid, 5,8,11,14-docosatetraenoic acid and cis-13-docosanoic acid.

An aromatic monobasic acid can optionally be used in any of the above methods. Suitable acids for use include monocarboxylic acids, especially aromatic monocarboxylic acids, such as benzoic acid, para-tertiarybutylbenzoic acid, toluic acid and chlorobenzoic acid.

Additional points of unsaturation can also be introduced into one or more alkyd moieties. Such unsaturation can be introduced, for example, in the form of "electron poor" compounds such as maleic acid or anhydride, fumaric acid, and itaconic acid. An "electron poor" compound is a compound containing at least one electron poor carbon-carbon double bond; an electron poor carbon-carbon double bond is one that is located in the molecule near one or more strong electron withdrawing groups, such as a carbonyl group. These unsaturated moieties can be introduced into the alkyd backbone by including compounds containing these moieties in the starting raw materials for the alkyd preparation. It will be appreciated that the unsaturation is maintained following incorporation of the compound into the backbone, such that additional points of unsaturation in the backbone are achieved. These types of electron poor molecules are appropriately used to react with certain electron rich ethylenic unsaturated molecules to free radically cure the system.

Useful hydroxyl-containing alkyd resins for use in the present polymers are those having an oil length of from about 15 percent to about 70 percent, such as from about 15 to 35 percent. Typically, the oil or fatty acid used in the alkyd has an iodine value of greater than 100. "Iodine value" refers to the amount of carbon-carbon double bonds and is measured by iodine titration.

The hydroxyl-containing alkyd resin is then reacted with one or more compounds that introduce the free-radical curing moiety onto the alkyd. Any means for attaching these moieties onto the alkyd backbone can be used. For example, compounds containing functionality that will react directly with the hydroxyl group of the alkyd can be used when such compounds also contain a free radical curing moiety. Examples of such compounds include isocyanate functional materials, (meth)acrylic acid, and (meth)acrylic esters with free radical curable moieties. One embodiment of the invention specifically excludes the addition of a free radical curable moiety by using the reaction product of a methacrylic acid ester having hydroxyl groups and an isocyanate compound having at least two isocyanate groups.

In a particularly suitable embodiment, an isocyanate-functional ethylenically unsaturated compound is reacted with the alkyd to form an ungelled urethane modified alkyd resin having pendant polymerizable groups. Embodiments having urethane linkages can give enhanced performance properties to the present compositions, particularly in the areas of toughness and adhesion. Suitable isocyanates are any known isocyanates that, when reacted with the hydroxyl containing alkyd resin, form an ungelled urethane modified alkyd resin having pendant polymerizable ethylenic unsaturation. For example, both urethane-free isocyanate-functional ethylenically unsaturated compounds and isocyanate-functional ethylenically unsaturated compounds having one or more urethane groups can be used.

Examples of urethane free isocyanate-functional compounds include isocyanatoalkyl (meth)acrylates such as isocyanatoethyl acrylate, isocyanatopropyl acrylate, isocyanatobutyl acrylate, isocyanatoethyl methacrylate, isocyanatopropyl methacrylate and isocyanatobutyl methacrylate; isocyanatoalkyl crotonates such as isocyanatobutyl crotonate; and isocyanate-functional monoalkenyl aromatic monomers such as alpha-methylstyrene-meta-isopropyl isocyanate and alpha-methylstyrene-para-isopropyl isocyanate. (Meth)acrylate and like terms are used conventionally in the art and herein to refer to both acrylate and methacrylate.

Isocyanate-functional ethylenically unsaturated compounds having one or more urethane groups can be prepared by the reaction of isocyanates, particularly diisocyanates, with ethylenically unsaturated alcohols in appropriate molar amounts to provide a predominance of mono-isocyanate-functional ethylenically unsaturated compounds. Examples of ethylenically unsaturated alcohols include acrylic functional monohydric alcohols such as (meth)acrylates, particularly hydroxyethyl acrylate, hydroxypropyl acrylate, hydroxybutyl acrylate, hydroxyethyl methacrylate, hydroxypropyl methacrylate and hydroxybutyl methacrylate; hydroxyalkyl crotonates such as hydroxybutyl crotonate; and allyl ethers of polyhydric alcohols such as trimethylolpropane diallyl ether, ethylene glycol monoallyl ether and pentaerythritol triallyl ether. Other ethylenically unsaturated moieties can be derived from "electron rich" compounds, for example, vinyl ethers including but not limited to hydroxyalkylvinyl ethers, such as hydroxybutyl and hydroxypropylvinyl ethers; and styrene. "Electron rich" compounds are compounds with electron rich carbon-carbon double bonds; an electron rich carbon-carbon double bond is one that is directly adjacent to one or more electron-donating groups, such as oxygen atoms from ether or ester groups, and aromatic rings.

Suitable isocyanates include any known di- or polyisocyanates that, when reacted with the alcohol, form an isocyanate-functional ethylenically unsaturated compound having a predominance of monoisocyanate functionality; "predominance" means at least about 50 percent. Examples of isocyanates include polyisocyanates and diisocyanates known in the art such as diphenylmethane diisocyanate, 1,6-hexamethylene diisocyanate and 3,5-toluene diisocyanate. Particularly suitable di- and polyisocyanates have differing reactivity caused, for example, by stearic hindrance, and include, for example, 2,4-toluene diisocyanate; mixtures of toluene diisocyanates having a majority of the species having differing activity, such as 80 percent 2,4-toluene diisocyanate and 20 percent 2,6-toluene diisocyanate by weight are also particularly suitable as is isophorone diisocyanate. Other polyisocyanates suitable for use in the present invention include diisocyanates, such as 2,6-toluene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'- diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)isocyanate, 2,2,4-trimethylhexamethylene diisocyanate, bis(2-isocyanate-ethyl) fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, and 2,5 (or 6)-bis(isocyanatemethyl)-bicyclo[2.2.1]heptane. Among these diisocyanates, 2,4-tolylene diisocyanate, isophorone diisocyanate, xylylene diisocyanate, and methylenebis(4-cyclohexylisocyanate) are particularly suitable. These diisocyanate compounds can be used either alone or in combination.

The preparation of the isocyanate-functional ethylenically unsaturated compounds having one or more urethane groups can be accomplished by any means known in the art. The temperature at which the reaction takes place depends upon the specific reactants. The reaction of toluene diisocyanate and hydroxyethyl (meth)acrylate, for example, generally takes place from 0° C. to 120° C., such as from 20° C. to 90° C., or at least about 25° C. The ratio of equivalents of alcohol to equivalents of isocyanate is typically between 0.8:2.0 and 1.2:2.0.

The alkyd resin and the isocyanate-functional ethylenically unsaturated compound are typically reacted together below 100° C. Above this temperature, in the absence of a suitable inhibitor, such as a free radical inhibitor, ethylenically unsaturated compounds may polymerize with themselves or other unsaturation in the alkyd. The reaction is typically carried out at about 65° C., optionally in the presence of an inhibitor and optionally in the presence of a catalyst. The inhibitor, such as 2,6-ditertiarybutyl-p-cresol (commercially available from Shell Oil Co. as IONOL) may be added to retard or prevent addition polymerization, such as free radical polymerization. The catalyst is used to promote reaction speed. An example of a suitable catalyst is dibutyltin dilaurate.

It will be appreciated based upon the reactions described above, that the polymers of the present invention comprise one or more alkyd portions and one or more free radical curing portions. Fatty acid moieties will be incorporated into the backbone of the alkyd portion, which will be a branched compound. Free radical curable moieties can be attached at the end of these branches. It will be understood, however, that not all branch ends will have a free radical curable moiety attached thereto, and in fact, there will most certainly be some branches to which a free radical curable moiety is not attached. In a particularly suitable embodiment, the pendant free radical curable moieties contain ethylenically unsaturated groups that are attached to the alkyd portion through urethane linkages. It will further be understood that certain of the free radical curable moieties, such as those derived from vinyl ether, could alternatively be cured by cationic cure. A moiety that can be cured by free radical cure is referred to herein as the "free radical curable portion", the "free radical moiety", or like terms. In one embodiment of the present invention, reaction of the polymer with an ethoxylated alkane triol is specifically excluded, and in another embodiment, the presence of a vinyl monomer in addition to the polymer is specifically excluded.

The amount of polymer in the composition will typically range from about 5 to 75 weight percent, such as about 5 to 25 weight percent, or 5 to 10 weight percent, with weight percent being based on the total weight of the composition. The polymers will typically have a hydroxy value of from about 0 to 40, such as 15 to 30, and an acid value of less than 5, such as less than 2. In addition, the Mw of the polymers will typically be from 3,000 to 10,000, such as 5,000 to 7,000, the Mn about 1,000 to 4,500, such as 2,000 to 3,500, and the Mw/Mn about 1.1 to 5, such as 2.0 to 4.0. "Mw" refers to the weight average molecular weight as determined by size exclusion chromatography relative to linear polystyrene standards; "Mn" is the number average molecular weight as determined by size exclusion chromatography relative to linear polystyrene standards.

As noted above, the composition further comprises a free radical initiator. Those skilled in the art will understand that free radical cure includes the steps of initiation, propagation, chain transfer and termination. Cure can be initiated by use of actinic light, electron beam or heat, depending on the application requirements; suitable initiators can be selected based upon the particular free radical cure desired and appropriate for the free radical curing moiety or moieties included in the polymer. When radiation cure is desired, the present compositions may comprise at least one photoinitiator. Conventional free radical photoinitiators can be used, including but not limited to benzophenones, acetophenone derivatives, such as alpha-hydroxyalkyl-phenylketones, benzoins such as benzoin alkyl ethers and benzyl ketals, phosphine oxides, monoacylphosphine oxides, and bisacylphosphine oxides. Free radical initiators are commercially available from, for example, Ciba Specialty Chemicals Corporation in their DURACURE and IRGACURE lines; IRGACURE 184, IRGACURE 651, IRGACURE 1800, DURACURE 1173 and DURACURE 4265 are particularly suitable.

When the present stains will undergo both free radical cure and oxidative cure, a thermal polymerization initiator can also be added Examples include peroxides such as benzoyl peroxide; azo compounds; t-butyl oxybenzoate; metal oxides such as manganese dioxide; and cobalt octate. It will be appreciated that these compounds initiate oxidative cure. Thermal initiators are commercially available, for example, from Atofina and DuPont.

The amount of free radical initiator in the present compositions will typically range from about 0.05 to 5.0 weight percent, such as about 0.1 to 0.5 weight percent, based on total weight of the composition. If a thermal initiator is used, it is also typically present in an amount from about 0.1 to 5.0 weight percent, such as 0.4 to 1.5 weight percent, based on total weight of the composition.

Certain embodiments of the present invention, more specifically those in which the free radical curable moieties have been derived from an "electron rich" compound, may also utilize, in addition to an initiator, an "electron poor" compound. Examples of suitable electron poor compounds include maleic acid, maleic anhydride, fumaric acid, and itaconic acid. It will be appreciated that crosslinking is achieved by reaction between the electron rich and electron poor moieties; the electron poor moiety can react with the electron rich moiety from one or more separate alkyd molecules. As discussed above, the electron poor compound can be incorporated directly into the alkyd backbone of the polymer, and/or an electron poor compound can be added separately to the composition.

The stains of the present invention further comprise a colorant portion that is dispersed in the remainder of the formulation. The colorant portion is comprised of one or more pigments, dyes and/or tints. Any combination of pigments, dyes and/or tints suitable for use in a stain can be used. Such products are widely commercially available, such as from DuPont, BASF and Elementis Specialties. The colorant comprises 0.1 to 30 weight percent, such as 1 to 6 weight percent of the total composition.

It will be understood in the art that "stains", in contrast to many other types of paints and coatings, are usually thinner and not as opaque. As such, stains do not typically exhibit the same level of hiding as other coatings. This is a beneficial feature when the substrate to be coated is wood; with wood substrates, it is typically desired to see the grain of the wood through the coating.

The composition further comprises a solvent. Suitable solvents include alkyl acetates, acetone, ketones, mono- and polyalcohols, aromatic hydrocarbons and mixtures thereof. It will be appreciated that the present stains are not aqueous based, although they might contain a small amount (i.e. <5 weight percent) of water. A solvent is typically present in an amount of about 10 to 95 weight percent, such as 70 to 90 weight percent, with weight percent being based on the total weight of the composition. It will be appreciated that lower levels of solvent will result in a "high solids" product. In one specific embodiment of the present invention, the composition has a solids content of more than 50 weight percent, and in another specific embodiment the solids content is 50 weight percent or less.

As noted above, when a drying or semi-drying oil predominates in the fatty acid moieties of the alkyd portion, the present polymers will undergo two kinds of cure, oxidative and free radical. Because both curing moieties are on the same molecule, the result is one crosslinked network, comprised of one molecule that crosslinks in two ways. This is distinct from many compositions taught in the art that comprise alkyd or other moieties in conjunction with reactive diluents. In those compositions, there are two separate crosslinked networks—one formed from reactive diluent, such as an acrylate network, and one formed from the alkyd network; thus, two separate networks coexist in the mixture. In these compositions, reactive diluents are intentionally introduced in quantities sufficient to produce a second crosslinked network. Again, this is distinct from the present compositions, which form one crosslinked network. The present compositions do not require the use of reactive diluents. Although small amounts of reactive diluents may be generated as by-products of other reactions, they are not generally intentionally introduced. If any reactive diluent is intentionally added to the present compositions, it is not present in an amount to produce a dense crosslink network, but rather is added to give the composition an immediate surface hardness via a quick cure. Such reactive diluents may be present, for example, in amounts of less than about 5 weight percent, based upon the total weight of the composition.

In addition, the present stains can contain other optional ingredients including ultraviolet absorbers, pigments and inhibitors known in the art. In addition, various fillers, plasticizers, flow control agents, surfactants and other known formulating additives may be used. Also useful in the coating compositions of the invention is an aluminum or titanium chelating crosslinker such as ALUSEC 510 ethyl acetoacetato-di-2-ethoxy ethoxy aluminum manufactured by Manchem Ltd. or TYZOR TPT tetraisopropyl titanate manufactured by DuPont Corporation. An antiskin agent such as methyl ethyl ketoxime is often added to improve package stability. Fillers and flatting agents, such as talc, clay, silica and the like can be added; suitable silicas are commercially available from W. R. Grace and Company as SYLOID 169 and from Degussa Corporation as AEROSIL 972. Sag resistance additives such as cellulose acetate butyrate 551-0.2 from Eastman Chemicals can also be included, as can other additives that enhance properties. Various additives, when used, typically comprise no more than about 30 weight percent, such as no more than about 10 weight percent, of the present compositions.

The present stains, as noted, have a dispersed colorant portion. The stains can be prepared, for example, by blending resin(s), additives and solvents to form a clear base. The appropriate ratio of pigments, dyes, and/or tints can then be added to the base to achieve the desired color and intensity.

The present coating compositions are suitable for application to porous substrates, such as paper, cardboard, particle board, fiber board, wood and wood products; wood substrates are particularly suitable. Various woods that can be stained with the present compositions include, for example, oak and maple. These types of woods are used in the preparation of, for example, kitchen cabinets, bath cabinets, tables, desks, dressers, and other furniture.

The present stains can be applied to the substrate by any means known in the art. For example, they can be applied by brushing, dipping, flow coating, conventional and electrostatic spraying. Typically, 0.5 to 5.0 wet mils are applied, allowed to soak in for a predetermined amount of time, and the excess stain wiped off. Multiple layers can be applied. The present stains can then be cured by initiating free radical cure. This can be done, for example, by exposing the coated substrate to UV radiation.

The oxidative air cure will occur after the free radical cure. Oxidative cure can be accomplished by merely allowing the coated substrate to be exposed to ambient or elevated temperature conditions. For example, the ambient or elevated temperature conditions can be those generally considered to be "air dry" or "force dry" conditions. This occurs at temperatures ranging from about 13° C. to 250° C., such as 20° C. to 150° C., or 50° C. to 90° C. Oxidative cure in the absence of accelerating conditions can take place over the course of several days to several weeks.

As will be appreciated, particularly in the treatment of wood substrates, additional layers such as a sealer and a topcoat may be applied over the top of the stain layer. According to the present invention, a sealer, topcoat or both can optionally be applied over top of the stain layer. "Sealant" will be understood as referring to the clearcoat applied directly to the stained surface, while a "topcoat" refers to the clearcoat applied directly to the sealer. The sealer and topcoat can be any such coatings known in the art. Sealers and topcoats are typically cured by an oxidative, free radical, or cationic process. In a particularly suitable embodiment, the sealer and/or topcoat, like the present stains, are also curable by free radical cure. For example, the topcoat can have a polymer comprising an alkyd portion and a free radical curable portion substantially as described above. Such formulations are illustrated in the Examples, and are further described in U.S. patent application Ser. No. 10/196, 804, filed Jul. 17, 2002, incorporated by reference herein.

In one embodiment of the present invention, the stain is applied to the substrate and undergoes either partial free radical cure or no free radical cure before application of the sealer/topcoat; application of the sealer/topcoat to the uncured stain will be understood by one skilled in the art as a "wet on wet" application. When the stain is uncured or only partially cured, the sealer/topcoat also can undergo free radical cure. After the sealer/topcoat is applied, the sealer/topcoat and stain are completely cured at the same time. In this manner, interlayer bonding may occur between the functional groups of the stain and the layer in direct contact with the stain. The inventions do not wish to be bound by this mechanism, however. Such an embodiment may offer desirable levels of toughness, appearance, feel and stain/solvent resistance. "Partial cure" will be understood as referring to any stage of curing between complete cure and no cure.

The present invention is further directed to a method for coating a substrate comprising applying any of the stains described above and initiating free radical cure. The method can further comprise the step of allowing oxidative cure to take place, which may or may not involve affirmative steps. That is, the oxidative cure can simply occur on its own, without additional action by the user. The method can further comprise applying a sealer, topcoat or both to the stained substrate; in this embodiment, the stain can undergo any level of cure, e.g. no cure, partial cure or complete cure, before application of any additional layer(s).

In addition, use of the present stains, particularly in conjunction with free radical curable topcoats, allows for increased speed in the coating process. The free radical curable stains can be cured in seconds and handled immediately. Accordingly, the present invention is further directed to a method for reducing cycle time in staining a wood substrate, comprising applying to the substrate any of the stains described above and initiating free radical cure. Typical alkyd urea systems currently being used in the art to stain wood substrates can take up to 45 minutes to cure.

As used herein, unless otherwise expressly specified, all numbers such as those expressing values, ranges, amounts or percentages may be read as if prefaced by the word "about", even if the term does not expressly appear. Plural encompasses singular and vice versa. Any numerical range recited herein is intended to include all sub-ranges subsumed therein. Also, as used herein, the term "polymer" is meant to refer to oligomers and both homopolymers and copolymers. The prefix "poly" as used herein refers to two or more.

EXAMPLES

The following examples are intended to illustrate the invention, and should not be construed as limiting the invention in any way.

Example 1

Part 1

An acrylate functional drying oil alkyd polymer of the present invention was prepared by first preparing a functionalizing agent using the follow procedure. 2005.6 parts by weight of isophorone diisocyanate, 7.0 parts by weight dibutyltin dilaurate, 1.5 parts by weight phenothiazine, and 5.7 parts by weight 2,6-di-tert-butyl methyl phenol were dissolved in 1000.5 parts by weight methyl isobutyl ketone in a flask equipped with a mechanical stirrer, nitrogen inlet tube, thermometer and a condenser. 1055.6 parts by weight of 2-hydroxyethyl acrylate were then added to the flask in a drop-wise fashion over three hours. The reaction vessel was not externally heated, but did increase in temperature during the course of the reaction due to the exothermic nature of the alcohol/isocyanate reaction. The highest temperature reached during the reaction was 74° C.

Part 2

An alkyd resin solution was prepared by mixing the ingredients in the amounts (parts by weight) shown in Table 1. The ingredients were added to a reaction vessel comprising a flask equipped with a mechanical stirrer, nitrogen inlet tube, thermometer, steam jacket column, fractionating column, and a distillation head connected to a condenser and a receiver. The resultant mixture was heated to react in a nitrogen atmosphere. At 160° C., water generated by the esterification process began to be collected. With continuous removal of water, heating continued to 182° C. The reaction was allowed to continue until the alkyd resin had an acid value of 20.4 mg KOH/gram. At this point, 157.1 parts by weight of neodecanoic acid oxiranyl methyl ester obtained from Exxon as CARDURA E were added to the reaction solution and allowed to react at 150° C. for two hours.

TABLE 1

| Ingredients | Parts by Weight |
| --- | --- |
| Linseed fatty acid | 503.2 |
| Neopentyl glycol | 70.2 |
| Trimethylol propane | 262.8 |
| Pentaerythritol | 163.1 |
| Phthalic anhydride | 435.0 |
| Benzoic acid | 190.0 |
| Hexahydrophthalic anhydride | 61.1 |
| Butyl stannoic acid | 1.9 |
| Toluene | 67.2 |
| Diisobutyl ketone | 527.8 |

The resin solution was then cooled, and to it was added 1018.7 parts by weight of the functionalizing agent prepared as described in Part 1, and 559.1 parts by weight methyl isobutyl ketone. The resin/functionalizing agent solution was then heated at 100° C., and held at that temperature until infrared spectroscopy indicated that all of the isocyanate groups had been consumed.

The reaction product was then cooled, discharged and analyzed. The determined solids content was 68.3% (by weight), acid value was 0.6 mg KOH/gram, and hydroxy value was 14.2 mg KOH/gram. Analysis of the resin solution by GPC (using linear polystyrene standards) showed the polymer to have an $M_w$ value of 7114, $M_n$ value of 1585, and an $M_w/M_n$ value of 4.5.

Example 2

A rouge stain was prepared using the polymer prepared in Example 1 and the other components listed in Table 2. The ingredients were added to a paint can with agitation from a Cowles blade. After addition of all ingredients, mixing was continued for approximately 5 to 10 minutes to ensure homogeneity.

TABLE 2

| Ingredients | Parts by Weight Sample 2 |
| --- | --- |
| Polymer from Example 1 | 13.20 |
| Linseed Oil | 2.67 |
| Bentone SD-1 Clay[a] | 0.82 |
| IRGACURE 1800[b] | 0.15 |
| SYLOID 169[c] | 1.06 |
| AEROSIL 972[d] | 0.15 |
| Burnt Umber Tint[e] | 9.79 |
| Organic Red Tint[f] | 0.92 |
| Black Tint[g] | 0.22 |
| Neazopan Black Tint[h] | 0.74 |
| Light Red Tint[i] | 0.28 |
| Mineral Spirits[j] | 36.53 |
| Solvesso 100[k] | 7.71 |
| Ethanol | 0.42 |

TABLE 2-continued

| Ingredients | Parts by Weight Sample 2 |
|---|---|
| VM&P Naptha[l] | 20.62 |
| Butanol | 4.72 |

[a]Organophilic clay obtained from Elementis Specialties.
[b]Mixture of bis((2,6 Dimethoxybenzoyl) 2,4,4 trimethylpentyl) phosphine oxide and 1-hydroxycyclohexyl phenyl ketone obtained from Ciba Specialty Chemicals Corporation.
[c]Micron sized silica gel from W. R. Grace and Company.
[d]Fumed silica obtained from Degussa Corporation.
[e]ST8509 Burnt Umber Tint obtained from Elementis Pigments.
[f]ST8673 Deep Organic Red Tint obtained from Elementis Pigments.
[g]ST8317 Tinting Black obtained from Elementis Pigments.
[h]Neozapon Black Tint in Acetone obtained from BASF Pigments.
[i]ST8668 Light Organic Red Tint obtained from Elementis Pigments.
[j]Aliphatic hydrocarbon mixture obtained from Exxon.
[k]Aromatic hydrocarbon mixture obtained from Exxon.
[l]Heavy aromatic naptha solvent obtained from Exxon.

Oak veneers were sanded with 180 grit sandpaper. Sample 2 was then applied to the oak veneers at a wet film thickness of 25 to 125 microns with a Binks 2001 hand-held spray gun using 30 to 40 PSI of air pressure to achieve a uniform layer. Wet film thickness was verified using a Paul N. Gardner Company Inc. wet film thickness gauge.

The stained veneer was allowed to stand for two minutes, after which the excess stain was wiped from the veneer with a cloth rag. The stained veneer was first given a five-minute ambient temperature flash, then given 800 mj/cm$^2$ of UV exposure, and then allowed to cool at ambient temperature for an additional five minutes. The cured veneer was then sanded with 280 grit sandpaper.

A linseed alkyd rouge stain (C1180A31, commercially available from PPG Industries, Inc.) was applied to oak veneers using the same application process as Sample 2. The veneer stained with the commercial product was allowed to stand for two minutes, after which the excess stain was wiped from the veneer with a cloth rag. The stained veneer was then given a ten-minute ambient temperature flash, followed by a three-minute 150° F. bake. The cured veneer was allowed to cool at ambient temperature for an additional five minutes and was then sanded with 280 grit sandpaper.

Coatings were prepared using the polymer prepared in Example 1 and the other components listed in Table 3. The ingredients were added to a paint can with agitation from a Cowles blade. After addition of all ingredients, mixing was continued for approximately 5 to 10 minutes to ensure homogeneity.

TABLE 3

| | Parts by Weight | |
|---|---|---|
| Ingredients | Sample 3 | Sample 4 |
| Polymer from Example 1 | 23.73 | 18.15 |
| VAGH Vinyl[m] | 4.63 | 9.50 |
| ACTILANE 440[n] | 2.68 | 0.67 |
| IRGACURE 1800 | 0.54 | 0.41 |
| Benzophenone[o] | 0.21 | 0.24 |
| BYK 301[p] | 0.16 | 0.20 |
| SYLOID 221[q] | 0.46 | 1.21 |
| TS 100[r] | 0.11 | 0.08 |
| 12% Cobalt CEM-ALL[s] | 0.10 | — |
| 24% Zirconium HEX-ALL[t] | 0.21 | — |
| 10% Calcium CEM-ALL[u] | 0.46 | — |
| Methyl ethyl ketone | 14.58 | 11.10 |
| Acetone | 22.95 | 25.61 |

TABLE 3-continued

| | Parts by Weight | |
|---|---|---|
| Ingredients | Sample 3 | Sample 4 |
| Methyl amyl ketone | 3.52 | 3.94 |
| Ethanol | 0.94 | 1.05 |
| Methyl isobutyl ketone | 3.11 | 3.43 |
| Xylene | 5.46 | 6.03 |
| Butanol | 1.69 | 2.32 |
| Toluene | 0.61 | 0.69 |
| VM&P Naptha | 1.22 | 1.37 |
| Methanol | 1.41 | 1.56 |
| n-butyl acetate | 11.25 | 12.44 |

[m]Vinyl chloride/Vinyl acetate/vinyl alcohol terpolymer obtained from Union Carbide Corporation.
[n]Aliphatic tetrafunctional acrylate from Akcros Chemicals.
[o]Diphenyl ketone obtained from Ciba Specialty Chemicals Corporation.
[p]Solution of polyether modified dimthylpolysiloxane copolymer obtained from Byk Chemie.
[q]Micron sized silica gel obtained from W. R. Grace and Company.
[r]Silica Dioxide Flattening Agent obtained from Degussa Corporation.
[s]Cobalt carboxylate obtained from OMG America Inc.
[t]Zirconium carboxylate obtained from OMG America Inc.
[u]Calcium carboxylate obtained from OMG America Inc.

Sample 3 was applied to stained and unstained oak veneers at a wet film thickness of 25 to 125 microns with a Binks 2001 hand-held spray gun using 30 to 40 PSI of air pressure to achieve a uniform layer. Wet film thickness was verified using a Paul N. Gardner Company Inc. wet film thickness gauge.

The coated veneers were given a five-minute ambient temperature flash, followed by a five-minute 150° F. heated flash. The veneers were then allowed to cool at ambient temperature for one minute, followed by 800 mj/cm$^2$ of UV exposure, then allowed to cool at ambient temperature for an additional five minutes.

The cured veneers were then sanded with 280 grit sandpaper prior to application of a second coat of Sample 3. Sample 4 was then applied to the veneers and cured in the same manner as Sample 3.

After the application and curing of the second coat, the veneers were allowed to rest at room temperature overnight. All of the veneers were then tested for nickel scrape resistance and tape adhesion. The results are listed in Table 4.

TABLE 4

| Stain | Sealer | Topcoat | Nickel Scrape[1] | Tape Adhesion[2] |
|---|---|---|---|---|
| Sample 2 | Sample 3 | Sample 4 | 4 | 3B |
| C1180A31 | Sample 3 | Sample 4 | 4 | 3B |
| None | Sample 3 | Sample 4 | 5 | 4B |

[1]Nickel scrape adhesion is a quantitative evaluation of a coating system's resistance to gouge. Nickel scrape was tested using five replicates on a single sample and with results reported in comparison to a control coating system. The test was conducted using a U.S. Government 5 cent coin without obviously worn surfaces. The nickel was grasped between the thumb and forefinger and, using medium to firm pressure, the nickel edge was scraped over the coated surface. The pressure # required to gouge the coated surface was assigned a whole number from 1 to 10 with 1 being minimal effort and 10 being maximum effort.
[2]Performed according to ASTM D-359, with performance rated on the following scale:
5B = 100% adhesion
4B = 99%–95% adhesion
3B = 85%–94% adhesion
2B = 65%–84% adhesion
1B = 35%–64% adhesion
0B = 0%–34% adhesion As can be seen in Table 4, the stain prepared according to the present invention gave tape adhesion and nickel scrape resistance equivalent to that of the commercial stain.

Example 3

An autumn stain was prepared using the polymer prepared in Example 1 and the other components listed in Table 5. The ingredients were added to a paint can with agitation from a Cowles blade. After addition of all ingredients, mixing was continued for approximately 5 to 10 minutes to ensure homogeneity. All of the oak veneers used in this example were sanded with 180 grit sandpaper before application of stain or paint.

TABLE 5

| Ingredients | Parts by Weight Sample 5 |
|---|---|
| Polymer from Example 1 | 14.42 |
| Linseed Oil | 2.91 |
| Bentone SD-1 Clay | 0.90 |
| IRGACURE 1800 | 0.16 |
| SYLOID 169 | 1.16 |
| AEROSIL 972 | 0.16 |
| Burnt Umber Tint | 1.23 |
| Burnt Sienna Tint[v] | 2.38 |
| Organic Yellow Tint[w] | 0.07 |
| Neazopan Black Tint | 0.09 |
| Mineral Spirits | 39.94 |
| Solvesso 100 | 8.42 |
| Ethanol | 0.46 |
| VM&P Naptha | 22.54 |
| Butanol | 5.16 |

[v]ST8505 Burnt Sienna Tint obtained from Elementis Pigments.
[w]ST8454 Light Organic Yellow Tint obtained from Elementis Pigments.

Sample 5 was applied, wiped, and cured in the same manner as Sample 2. A linseed alkyd stain essentially the same as C1180A31 but formulated with the same tints listed in Table 5 ("autumn stain") was applied, wiped, and cured in the same manner as commercial stain C1180A31 in Example 2.

Coatings were prepared using the polymer prepared in Example 1 and the other components listed in Table 6. The ingredients were added to a paint can with agitation from a Cowles blade. After addition of all ingredients, mixing was continued for approximately 5 to 10 minutes to ensure homogeneity.

TABLE 6

| | Parts by Weight | |
|---|---|---|
| Ingredients | Sample 6 | Sample 7 |
| Polymer from Example 1 | 23.91 | 18.13 |
| VAGH Vinyl | 4.67 | 4.71 |
| Actilane 440 | 2.70 | 4.74 |
| IRGACURE 1800 | 0.54 | 0.40 |
| Benzophenone | 0.22 | 0.23 |
| BYK 301 | 0.16 | 0.19 |
| SYLOID 221 | 0.46 | 1.20 |
| TS 100 | 0.11 | 0.08 |
| Methyl ethyl ketone | 14.69 | 10.97 |
| Acetone | 23.13 | 26.22 |
| Methyl amyl ketone | 3.55 | 4.01 |
| Ethanol | 0.95 | 1.08 |
| Methyl isobutyl ketone | 3.13 | 3.57 |
| Xylene | 5.51 | 6.28 |
| Butanol | 1.70 | 1.64 |
| Toluene | 0.61 | 0.68 |
| VM&P Naptha | 1.24 | 1.40 |
| Methanol | 1.42 | 1.61 |
| n-butyl acetate | 11.30 | 12.86 |

Sample 6 was applied, cured, and sanded in the same manner as Sample 3. Sample 7 was applied and cured in the same manner as Sample 4.

An alkyd, urea conversion varnish (C1157Z63, obtained from PPG Industries, Inc.) was applied to stained and unstained oak veneers using the same application process as Sample 6. The coated veneers were given a 10-minute ambient temperature flash, followed by a 10-minute 150° F. bake. The cured veneers were allowed to cool at ambient temperature for an additional five minutes and were then sanded with 280 grit sandpaper. The second coat was applied and cured in the same manner as the first coat.

After the application and curing of the second coat, the veneers were allowed to rest at room temperature overnight. All of the veneers were then tested for nickel scrape resistance and tape adhesion. The results are listed in Table 7.

TABLE 7

| Stain | Sealer | Topcoat | Nickel Scrape | Tape Adhesion |
|---|---|---|---|---|
| Sample 5 | Sample 6 | Sample 7 | 4 | 2B |
| Autumn stain | Sample 6 | Sample 7 | 3 | 2B |
| None | Sample 6 | Sample 7 | 5 | 2B |
| Sample 5 | C1157Z63 | C1157Z63 | 6 | 5B |
| Autumn stain | C1157Z63 | C1157Z63 | 4 | 5B |
| None | C1157Z63 | C1157Z63 | 4 | 5B |

As seen in Table 7, veneers stained with the present invention had nickel scrape resistance superior to that of the autumn stain, which had a conventional linseed alkyd base.

Example 4

A rouge stain was prepared using the polymer prepared in Example 1 and the other components listed in Table 8. The ingredients were added to a paint can with agitation from a Cowles blade. After addition of all ingredients, mixing was continued for approximately 5 to 10 minutes to ensure homogeneity. All of the oak veneers used in this example were sanded with 180 grit sandpaper before application of stain or paint.

TABLE 8

| Ingredients | Parts by Weight Sample 8 |
|---|---|
| C1180A31 | 48.20 |
| Polymer from Example 1 | 11.76 |
| IRGACURE 819 | 0.63 |
| n-butyl acetate | 1.81 |
| Isobutyl acetate | 10.60 |
| Isopropanol | 11.86 |
| Lactol Spirits 2300[x] | 5.95 |
| Toluene | 2.95 |
| Ethyl Acetate | 5.33 |
| MEK | 0.91 |

[x]Petroleum hydrocarbon fraction obtained from Citgo Petroleum Corporation.

Sample 8 was applied and wiped in the same manner as Sample 2. Three different combinations of ambient flash, UV cure, and sanding were evaluated. Curing parameter I is the same methodology used for Sample 2. Curing parameter II omits the ambient flash and sanding steps. Curing parameter III omits all three steps.

A coating was prepared using the polymer prepared in Example 1 and the other components listed in Table 9. The ingredients were added to a paint can with agitation from a Cowles blade. After addition of all ingredients, mixing was continued for approximately 5 to 10 minutes to ensure homogeneity.

TABLE 9

| Ingredients | Parts by Weight Sample 9 |
| --- | --- |
| Polymer from Example 1 | 15.27 |
| VAGH Vinyl | 2.67 |
| 12% Cobalt Cem-All | 0.08 |
| 24% Zirconium Hex-All | 0.13 |
| 10% Calcium Cem-All | 0.31 |
| IRGACURE 1800 | 0.27 |
| Benzophenone | 0.1 |
| BYK 301 | 0.01 |
| BYK 051 | 0.001 |
| SYLOID 221 | 0.27 |
| TS 100 | 0.03 |
| ACTILANE 440 | 2.74 |
| Xylene | 3.88 |
| Butanol | 2.02 |
| VM&P Naptha | 0.81 |
| Toluene | 0.39 |
| n-butyl acetate | 12.21 |
| Isobutyl acetate | 4.05 |
| Methyl amyl ketone | 2.48 |
| Methanol | 0.71 |
| Ethanol | 2.13 |
| Methyl isobutyl ketone | 3.03 |
| Acetone | 40.44 |
| Methyl ethyl ketone | 3.04 |
| Isopropanol | 1.42 |

Sample 9 was applied to the stained oak veneers, cured, and sanded in the same manner as Sample 3. The second coat was applied and cured in the same manner as the first coat.

After the application and curing of the second coat, the veneers were allowed to rest at room temperature overnight. All of the veneers were then tested for nickel scrape resistance and tape adhesion. The results are listed in Table 10.

TABLE 10

| Stain Cure Parameter | Nickel Scrape | Tape Adhesion |
| --- | --- | --- |
| I | 2 | 3B |
| II | 1 | 0B |
| III | 4 | 4B |

As seen in Table 10, nickel scrape resistance and tape adhesion of the present invention was the best when stain cure parameter III was implemented; in this embodiment the stain was cured with the topcoat.

Whereas particular embodiments of this invention have been described above for purposes of illustration, it will be evident to those skilled in the art that numerous variations of the details of the present invention may be made without departing from the invention as defined in the appended claims.

We claim:

1. A stain comprising:
   A) a polymer comprising:
      i) an alkyd portion and
      ii) a free radical curable portion;
   B) a free radical initiator;
   C) a colorant portion; and
   D) a solvent.

2. The stain of claim 1, wherein the alkyd portion comprises a fatty acid moiety derived from one or more drying oils, semi-drying oils, nondrying oils, or mixtures thereof.

3. The stain of claim 2, wherein the fatty acid moiety is derived from a drying oil.

4. The stain of claim 1, wherein the free radical curable moiety contains polymerizable ethylenically unsaturated groups.

5. The stain of claim 4, wherein the polymerizable ethylenically unsaturated groups are acrylate groups.

6. The stain of claim 4, wherein the polymerizable ethylenically unsaturated groups are vinyl ether groups.

7. The stain of claim 4, wherein the polymerizable ethylenically unsaturated group is derived from an electron rich compound.

8. The stain of claim 7, further comprising an electron poor compound.

9. The stain of claim 1, wherein the polymer has a hydroxy value of 0 to 40.

10. The stain of claim 9, wherein the hydroxy value is 15 to 30.

11. The stain of claim 1, wherein the polymer has a acid value of less than 5.

12. The stain of claim 11, wherein the acid value is less than 2.

13. The stain of claim 1, wherein the polymer is present in a weight percent of 5 to 25, with weight percent being based on the total weight of the composition.

14. The stain of claim 1, wherein the free radical initiator is present in a weight percent of 0.1 to 0.5, with weight percent being based on the total weight of the composition.

15. The stain of claim 1, wherein the colorant portion is present in a weight percent of 1 to 6, with weight percent being based on the total weight of the composition.

16. The stain of claim 1, wherein the solvent is present in a weight percent of 70 to 90, with weight percent being based on the total weight of the composition.

17. A wooden substrate coated with the composition of claim 1.

18. The wooden substrate of claim 17, wherein the wood is selected from the group consisting of oak and maple.

19. The substrate of claim 17, wherein the substrate is a cabinet.

20. The substrate of claim 17, wherein the substrate is furniture.

21. A method for staining a substrate comprising:
   a) applying the stain of claim 1 to the substrate; and
   b) initiating cure of the free radical curable portion.

22. The method of claim 21, wherein said method further comprises
   c) applying a sealer or a topcoat that is free radical curable to the stain layer.

23. The method of claim 22, wherein only partial cure of the stain is effected in step (b), and said method further comprises (d) completely curing the stain and sealer or topcoat together.

24. A method for staining a substrate comprising:
   a) applying the stain of claim 1 to the substrate;
   b) applying a free radical curable sealer or topcoat on top of the stain; and
   c) concurrently effecting free radical cure of the stain and sealer or topcoat.

25. A method for reducing cycle time in the staining of a substrate comprising wood, comprising applying to the substrate the stain of claim 1 and initiating cure of the free radical curable portion.

26. The method of claim 25 further comprising the step of applying a free radical curable sealer or topcoat to the stain either before or after cure of the stain is initiated.

27. The stain of claim 2, wherein the fatty acid moiety is derived from an oil having an iodine value of 100 or greater.

28. A substrate having:
a) a free radically cured stain coat and
b) a free radically cured sealer or topcoat on top of the stain coat.

29. The substrate of claim 28, wherein the substrate is wood.

30. The substrate of claim 28, wherein either the stain, or the sealer or topcoat are both UV cured.

31. The stain of claim 3, wherein the drying oil is linseed oil.

* * * * *